United States Patent [19]

Dennany, Jr.

[11] Patent Number: 5,028,080
[45] Date of Patent: Jul. 2, 1991

[54] QUICK CONNECT COUPLING

[75] Inventor: Robert D. Dennany, Jr., Lapeer, Mich.

[73] Assignee: Handy & Harman Automotive Group, Inc., Auburn Hills, Mich.

[21] Appl. No.: 408,346

[22] Filed: Sep. 18, 1989

[51] Int. Cl.$^5$ ............................................. F16L 37/10
[52] U.S. Cl. ................................... 285/308; 285/319; 285/910; 285/921
[58] Field of Search ............... 285/308, 319, 910, 314, 285/315, 921

[56] References Cited

U.S. PATENT DOCUMENTS

| | | | |
|---|---|---|---|
| 2,983,533 | 5/1961 | Tisch | 285/910 X |
| 3,314,696 | 4/1967 | Ferguson et al. | 285/174 |
| 3,625,551 | 12/1971 | Branton et al. | 285/305 |
| 3,628,768 | 12/1971 | Hutt | 251/148 |
| 4,278,276 | 7/1981 | Ekman | 285/49 |
| 4,423,892 | 1/1984 | Bartholomew | 285/319 |
| 4,635,974 | 1/1987 | Moussaian | 285/305 |
| 4,768,587 | 9/1988 | Halder | 165/177 |
| 4,772,052 | 9/1988 | Morain | 285/305 |
| 4,915,421 | 4/1990 | Dennany, Jr. | |

FOREIGN PATENT DOCUMENTS

| | | |
|---|---|---|
| 2028711 | 12/1971 | Fed. Rep. of Germany . |
| 3440753 | 5/1986 | Fed. Rep. of Germany . |
| 2442393 | 7/1980 | France .................... 285/314 |
| 1030535 | 5/1966 | United Kingdom . |
| 1042774 | 9/1966 | United Kingdom ........ 285/319 |

Primary Examiner—Dave W. Arola
Attorney, Agent, or Firm—Pennie & Edmonds

[57] ABSTRACT

A readily attachable and detachable coupling for connecting conduits, having a receptacle assembly with a profiled bore, a first end designed to mate with one end of a first conduit and a second end adapted to receive a mating plug member. The plug member is provided with a first end adapted to mate with the second end of the receptacle, a second end adapted to mate with a second conduit, a constant diameter axial bore and an annular retaining flange. A locking assembly having an engaged position and a disengaged position is mounted to the second end of the receptacle assembly. The locking assembly includes a pair of resilient spring elements operatively associated with a rotatable collar so that rotation of the collar disengages the locking assembly. The locking assembly is designed to return to the engaged position once the rotative force has been removed. When the plug is inserted into the receptacle, the annular flange outwardly displaces the spring elements. The spring elements then return to their initial configuration thereby engaging the retaining flange, preventing relative axial movement between the plug and the receptacle. The coupling is readily detached by rotating the collar thereby forcing the locking assembly into the disengaged position, and extracting the plug member. The coupling also includes a sealing member which renders the connection fluid-tight.

32 Claims, 6 Drawing Sheets

QUICK CONNECT COUPLING

TECHNICAL FIELD

The invention relates to an improved quick connect coupling for joining conduits, and more specifically to a quick connect coupling having a rotatable locking collar to facilitate rapid and simple connection or disconnection.

BACKGROUND ACT

Various coupling devices have been developed which connect a first conduit or pipe to a second conduit or pipe. Typically these couplings include a female receptacle secured to one end of the first conduit to be connected and a mating male plug secured to one end of the second conduit. The conduits are connected together by securing the male plug in position within the female receptacle in a fluid-tight manner.

Several methods of securing the male plug to the receptacle have been employed. In earlier couplings, the receptacle was provided with a threaded chamber sized to receive the plug. The plug was equipped with mating threads so that the plug and the receptacle could be screwed together to complete the connection. This has proven, however, to be an ineffective and time consuming method of connecting conduits.

More recently, "plug-in" type couplings have been developed whereby the male plug is slideably received and secured within the female receptacle chamber without screwing the mating parts together. This type of coupling has the advantage of providing a quick connect configuration since the plug is pushed into the receptacle without the time consuming turning motion.

"Plug-in" couplings typically employ a single, shaped spring positioned within an opening in the receptacle, which extends through the exterior of the receptacle into the inner chamber to secure the plug.

In one common configuration, the spring secures the plug by engaging a circumferential groove or recess in the outer surface of the plug to prevent axial displacement of the plug relative to the receptacle. Some examples of couplings employing this configuration include U.S. Pat. Nos. 3,625,551, 3,628,768, 4,278,296, 4,635,974 as well as German Pat. Pub. Nos. DE 2,028,711 and DE 3,440,753.

In another common configuration, the spring secures the plug by resting against a peripheral flange on the plug. U.S. Pat. Nos. 3,314,696, 4,768,587, 4,772,052 and British Pat. Pub. No. GB 1,030,535 are a few examples of these types of couplings.

Both of these configurations suffer from the numerous shortcomings, namely the opening in the receptacle exposes the inner portion of the coupling to the corrosive effects of the environment and the complex shaped springs are expensive to manufacture as well as difficult to install. Furthermore, the pinching or squeezing of the spring to detach the plug from the receptacle is awkward and often requires the use of a tool, such as a screwdriver.

SUMMARY OF THE INVENTION

The present invention offers an improvement over the prior art in that the locking springs are completely contained within the receptacle and are operatively associated with a collar, the rotation of which causes the spring to disengage the plug. The quick connect coupling of the invention includes a receptacle member, a plug member, a rotatable locking member and a sealing member. The receptacle member includes a first end configured to mate with one end of a first conduit to be connected, a second end adapted to receive the plug member, and an aperture extending through and connecting these two ends to form a profiled bore coincident with the longitudinal axes thereof.

The plug member of the coupling includes a tubular body having inner and outer surfaces, a first end configured and adapted to fit into the profiled bore of the receptacle, and a second end configured to mate with one end of a second conduit. The inner surface of the plug defines an axial bore of constant diameter which extends longitudinally from the first end to the second end. The outer surface further includes an outwardly extending annular flange which is spaced from the first end and acts as a retaining member.

The locking member, which is mounted upon the second end of the receptacle, has an engaged position and a disengaged position to facilitate the attachment and detachment of the plug to the receptacle. Included in the locking member are a pair of resilient spring elements and a tubular rotatable collar which is operatively associated with the spring elements. An opening is provided in the collar to accommodate the first end of the plug. Each of the spring elements has a portion projecting inward across a segment of the collar opening when the locking member in the engaged position.

The profiled bore of the receptacle includes three portions a first smaller diameter cylindrical portion adjacent to the first end thereof; a second cylindrical portion larger in diameter and adjacent to the first cylindrical portion; and a third cylindrical portion between the second cylindrical portion and the second end of the receptacle. The third cylindrical portion is larger in diameter than the second cylindrical portion. A first annular shoulder is formed at the interface between the first cylindrical portion and the second cylindrical portion. Similarly, a second annular shoulder is formed between the second and third cylindrical portions.

The outer diameter of the tubular plug is slightly larger than the inner diameter of the first cylindrical portion of the receptacle but is slightly smaller than the inner diameter of the second cylindrical portion. Thus, the plug member is slideable within the second cylindrical portion until the retaining member of the plug abuts the second annular shoulder of the receptacle.

In one embodiment of the invention, the receptacle member is an assembly including male and female tubular mating members. In this embodiment, the male tubular member has a first end configured and adapted for engaging one end of the first conduit. A second end of this member has an enlarged cylindrical portion. The female tubular member has a first cylindrical portion adjacent to a first end which is configured and adapted to receive the enlarged cylindrical portion of the male member therewithin. The female member also has a second larger cylindrical portion adjacent to a second end as well as means for rotatably securing the locking member thereto.

The spring elements of the locking member include a central section of a truncated semi-conical shape having a partial cylindrical shape extending away from the smaller diameter end of the semi-conical shape and a planar flange extending outward from each side of the central section. These spring elements may be made of any metal or plastic material capable of imparting proper strength and resiliency to the element.

Preferably, the spring elements are disposed within the second larger cylindrical portion of the female tubular member of the receptacle so that the semi-conical sections of the respective springs are diametrically opposed thereby forming a funnel-shape projecting inward towards the first end of the receptacle. The spring elements are loosely held in place by two inwardly extending projections on the collar so that rotation of the collar places the locking member in the disengaged position while release of the collar returns the member to the engaged position.

The sealing member is preferably a seal secured within the profiled bore of the receptacle assembly. This seal may be entrapped between an annular shoulder adjacent to the enlarged cylindrical portion of the male tubular member and an annular shoulder adjacent to the first cylindrical portion of the female tubular member of the receptacle. Positioned as such, the seal forms a fluid-tight seal between the outer surface of the plug and the profiled bore.

The coupling is designed so that the plug member is insertable within the receptacle member whereby the annular retaining flange automatically displaces the inwardly projecting portions of the spring elements. The spring elements return to their initial configuration after the annular retaining flange passes through them. The spring elements thus rest on the back side of the retaining flange thereby securing the plug to the receptacle.

BRIEF DESCRIPTION OF THE DRAWINGS

The nature, advantages, and various other additional features of the invention will appear more fully upon consideration of the illustrative embodiments now to be described in detail in connection with the accompanying drawing figures, wherein:

FIG. 2 is an isometric view of the assembled quick connect coupling of. FIG. 1;

DETAILED DESCRIPTION OF THE PREFERRED EMBODIMENTS

Figure 1:
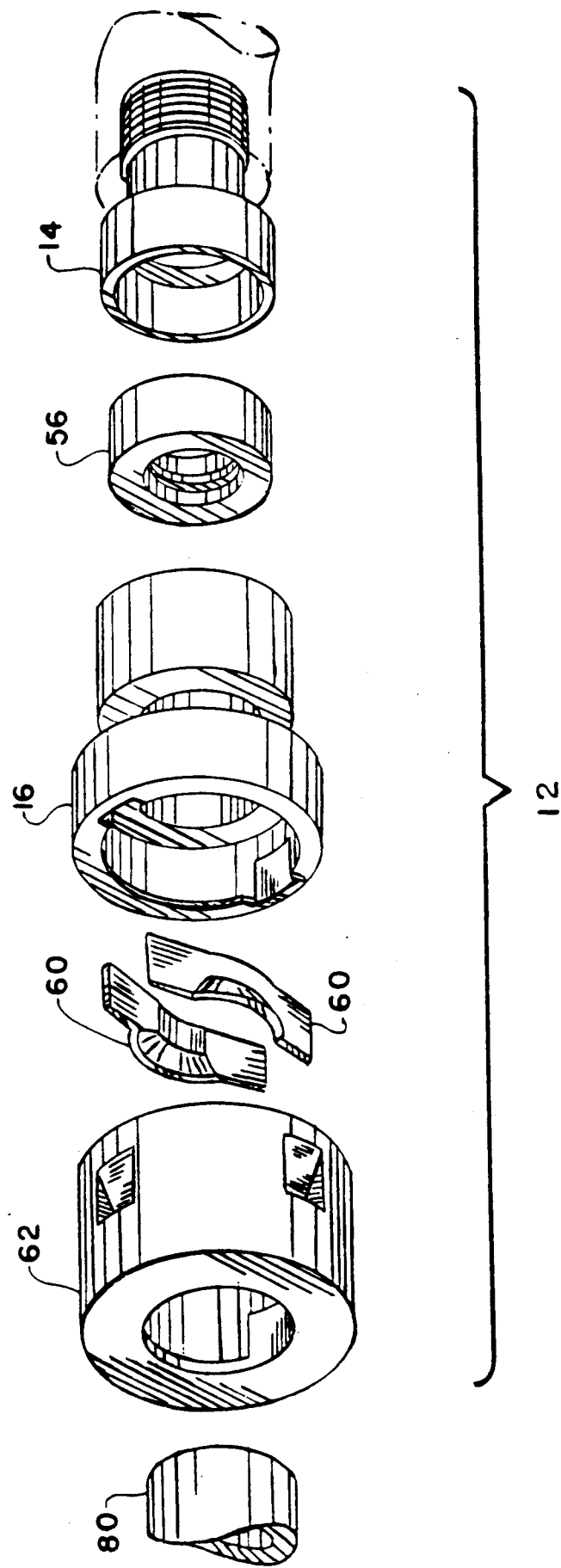
FIG. 1 is an exploded isometric view of one embodiment of the quick connect coupling of the present invention.
Figure 2:
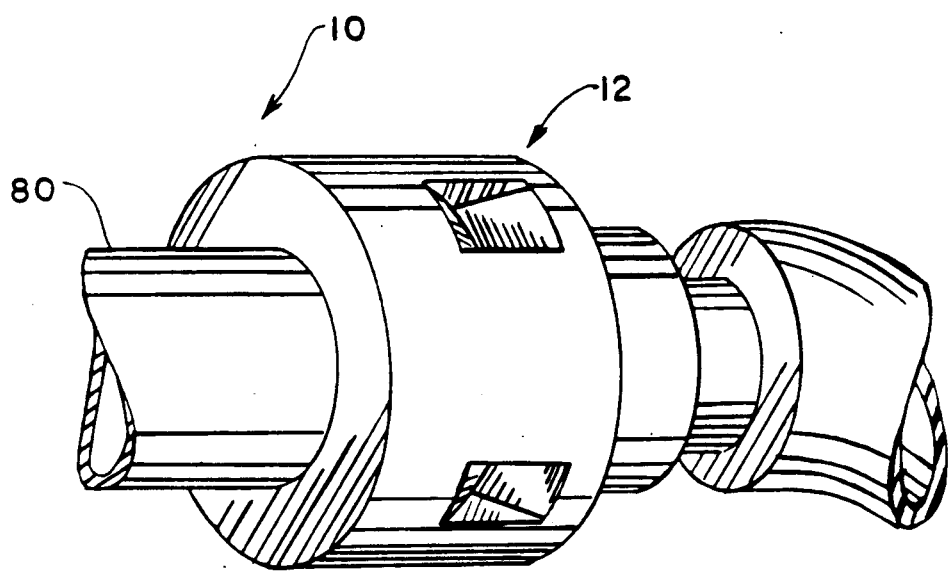
Figure 3:
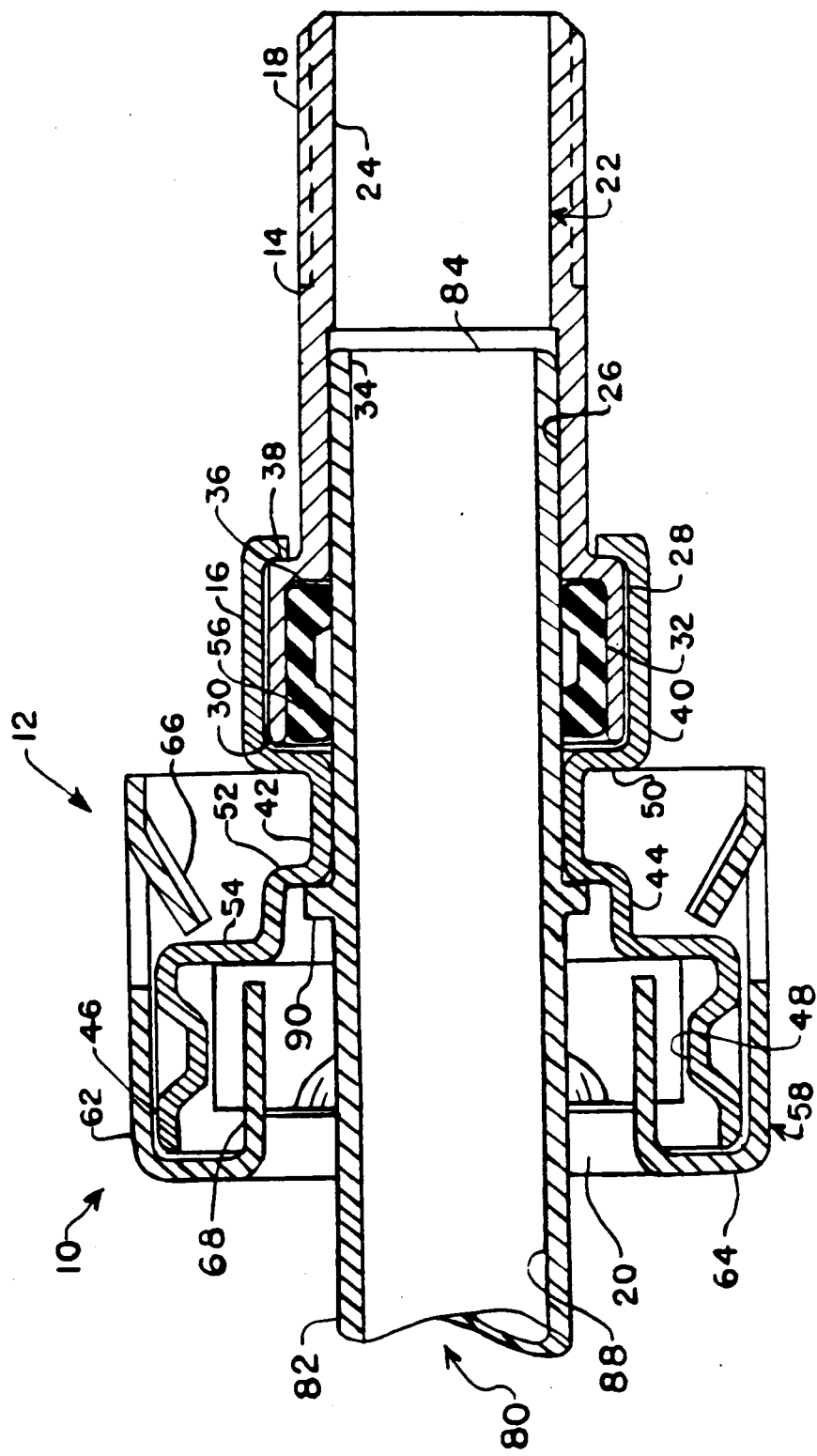
FIG. 3 is a sectional view of the coupling of FIG. 1 taken along its longitudinal axis.

Referring now to FIGS. 1-3, there is illustrated a coupling 10 for connecting conduits, which includes a plug member 80 and a receptacle member 12 which further includes a male member 14 and mating female member 16. Receptacle 12 has a first end 18 designed to mate with one end of a first conduit to be connected, a second end 20 adapted to receive plug 80 and a profiled bore 22 extending longitudinally therethrough.

Male member 14 of receptacle 12 includes a body having: a first end corresponding to first end 18 of receptacle 12; a first tubular portion with a first cylindrical bore 24 adjacent to first end 18 and a second cylindrical bore 26 larger in diameter and adjacent to first cylindrical bore 24; and an enlarged tubular portion 28 adjacent to a second end 30. Enlarged tubular portion 28 further includes an enlarged cylindrical bore 32. Internal annular shoulders 34 and 36 are formed between cylindrical bores 24 and 26, and 26 and 32 respectively. External annular shoulder 38 is similarly formed between the first tubular portion and enlarged tubular portion 28.

Female member 16 of receptacle 12 has a first cylindrical portion 40 adjacent to a first end adapted to receive enlarged cylindrical portion 28 of male member 14; a second cylindrical portion 42 with an inner diameter corresponding to the inner diameter of second cylindrical bore 26 of male member 14; a third larger cylindrical portion 44; and a fourth enlarged cylindrical portion 46 adjacent to a second end having a pair of diametrically opposed indents 48. Annular shoulders 50, 52 and 54 are formed between cylindrical portions 40 and 42, 42 and 44, and 44 and 46 respectively.

Coupling 10 also includes a sealing member which renders the connection fluid-tight. Numerous methods and materials for forming fluid-tight connections are well known to those skilled in the art. In the preferred embodiment, however, a single member two lobed seal 56 is positioned within receptacle 12 to establish a fluid-tight seal between the outer surface of plug 80 and profiled bore 22 of receptacle 12.

In the preferred embodiment, two lobed seal 56 is first placed within enlarged cylindrical portion 28 of male member 14 so that it rests against internal annular shoulder 36. Male member 14 is then slid into first cylindrical portion 40 of female member 16 until second end 30 abuts the inner surface of shoulder 50, thus entrapping seal 56. The wall of first cylindrical portion 40 is then bent about external shoulder 38 of male member 14 thereby locking male member 14 to female member 16.

A locking assembly 58 having an engaged position and a disengaged position to facilitate the attachment and detachment of plug 80 is mounted onto second end 20 of receptacle 12. Locking assembly 58 includes a pair of resilient spring elements 60 (see FIG. 1) which comprise a central portion having a truncated semi-conical shape, a partial cylindrical portion extending away from the smaller diameter end of the semi-conical shape and a planar flange projecting outward from each side of the central portion.

Locking assembly 58 further includes a tubular collar 62 having a U-shaped lower flange 64 defining an opening to receive plug 80, which is rotatably mounted onto second end 20 of receptacle 12. Collar 62 is operatively associated with spring elements 60 whereby rotation of collar 62 places spring elements 60 in the disengaged position. Spring elements 60 are sufficiently resilient so that when collar 62 is released, spring elements 60 return to the engaged position.

In the preferred embodiment, spring elements 60 are disposed within fourth cylindrical portion 46 of female member 16 so that their semi-conical sections are diametrically opposed thereby forming a funnel-shape projecting inward towards first end 18 of receptacle 12 (See FIG. 1). Preferably, the ends of the planar flanges of spring elements 60 abut opposed indents 48 which limit their movement within cylindrical portion 46. The central portion of the spring elements 60 projects inward across a segment of the opening in collar 62 when locking assembly 58 is in the engaged position.

Tubular collar 62 is placed around female member 16 so that the inner surface of U-shaped flange 64 abuts a second end of fourth enlarged cylindrical portion 46. At least two inwardly projecting legs 66 are then punched from the sidewall of collar 62. The innermost edge of legs 66 rest upon the external surface of annular shoulder 54 thereby rotatably mounting collar 62 to receptacle 12. In the preferred embodiment, four equal spaced legs 66 are punched from the sidewall of collar 62.

U-shaped lower flange 64 of collar 62 is also equipped with a pair of integrally formed projections 68 which extend away from lower flange 64 towards first end 18 of receptacle 12. Projections 68 are diametrically opposed and coincide with indents 48 of female member 16 when locking assembly 58 is in the engaged position. Thus, when collar 62 is rotated, projections 68 encounter the central portion of spring elements 60 which projects across the opening in the collar. Further rotation of collar 62 causes projections 68 to force spring elements 60 outward against the inner wall of fourth cylindrical portion 46 of female member 16. This orientation of spring elements 60 and collar 62 corresponds to the disengaged position of locking assembly 58. In order to prevent the condition whereby locking assembly 58 becomes stuck in the disengaged position, collar 62 can only be rotated about the coupling's longitudinal axis to an angle of about 30°, with respect to the collar's initial at rest position. Thus, resilient spring elements 60 force locking assembly 58 to return to the engaged position once the rotational force is removed. It should be noted that spring elements 60 have sufficient resiliency to prevent inadvertent rotation of collar 62.

Once locking assembly 58 has been mounted onto receptacle 12, profiled bore 22 of the receptacle is fully defined. Bore 22 comprises three portions; a first smaller diameter cylindrical portion corresponding to first cylindrical bore 24 of male member 14; a second larger diameter cylindrical portion formed by second cylindrical bore 26 of male member 14, the inner diameter of two lobed single seal 56, and second cylindrical portion 42 of female member 16; and a third larger diameter cylindrical portion formed by third cylindrical portion 44 of female member 16, the inner annular edge of U-shaped flange 64 and projections 68 of collar 62.

Plug member 80 includes a tubular body 82 made of a stiff material such as plastic or metal, having a first end 84 adapted to enter profiled bore 22, a second end 86 designed to mate with one end of a second conduit, inner and outer surfaces, the inner surface defining an axial bore 88 of constant diameter extending longitudinally therethrough and an annular retaining flange 90 spaced from first end 84.

The outer diameter of plug 80 between first end 84 and retaining flange 90 is slightly larger than the inner diameter of first cylindrical portion 24 of profiled bore 22 and is slightly smaller than the inner diameter of the second cylindrical portion of profiled bore 22. Similarly, the outer diameter of annular flange 90 is slightly larger than the inner diameter of the second cylindrical portion of axial bore 22 and is slightly smaller than the inner diameter of the third cylindrical portion. Thus, plug 80 is slideable within profiled bore 22 until a first surface of annular flange 90 abuts the inner surface of annular shoulder 52, which acts as a stop. Plug 80 and receptacle 12 are designed so that the distance from the first surface of annular flange 90 to first end 84 of plug 80 is somewhat smaller than the distance from the inner surface of annular shoulder 52 to internal annular shoulder 34. Therefore, there is a slight clearance between first end 84 of plug 80 and annular shoulder 34 of receptacle 12 when the plug is fully installed within the receptacle.

When plug 80 is inserted into receptacle 12, the first surface of annular flange 90 engages the inward projecting portions of spring elements 60. As force is applied to plug 80 within receptacle 12 the inward projecting portions of spring elements 60 are expanded by moving outward. This permits annular flange 90 to move past spring elements 60 into profiled bore 22. When flange 90 has moved past spring elements 60, these elements return to their initial position thereby engaging the second surface of annular flange 90. Thus, plug 80 is retained within receptacle 12 preventing any axial displacement therebetween.

To remove or detach plug 80 from receptacle 12, a user rotates collar 62 until locking assembly 58 is in the disengaged position. As previously described, in the disengaged position spring elements 60 are forced outward by projections 68. When in the disengaged position, plug 80 can be withdrawn from profiled bore 22 without any interference between annular flange 90 and spring elements 60. After plug 80 is withdrawn, the user releases collar 62 and locking assembly 58 returns to the engage position.

Receptacle 12 is shown in FIG. 1 as having an externally threaded portion adjacent to first end 18. This threaded portion is illustrative of one suitable means for engaging a conduit, pipe or hose. As known to one skilled in the art, first end 18 may be equipped with numerous other engaging means such as a plurality of serrations, a snap-fit retaining lip or any other suitable means.

Figure 4:
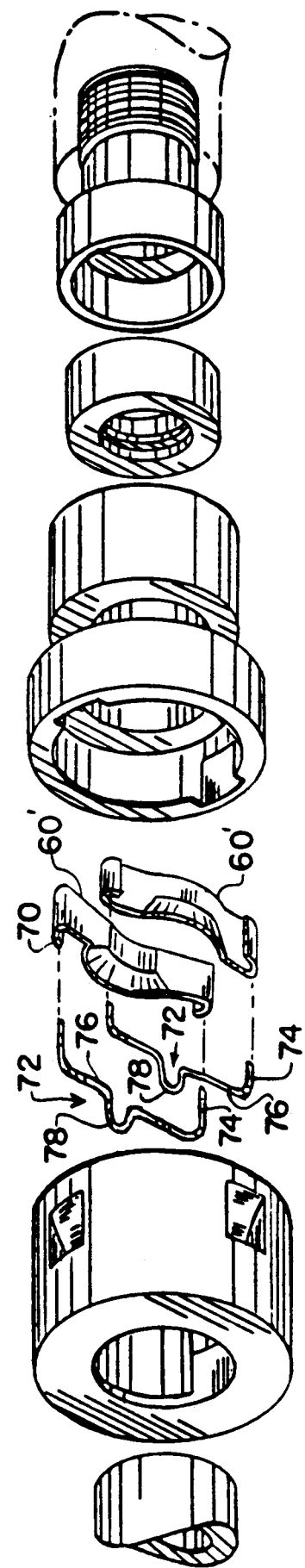
FIG. 4 is an exploded isometric view of a second embodiment of a coupling according to the invention, having a set of retaining clips.
Figure 5:
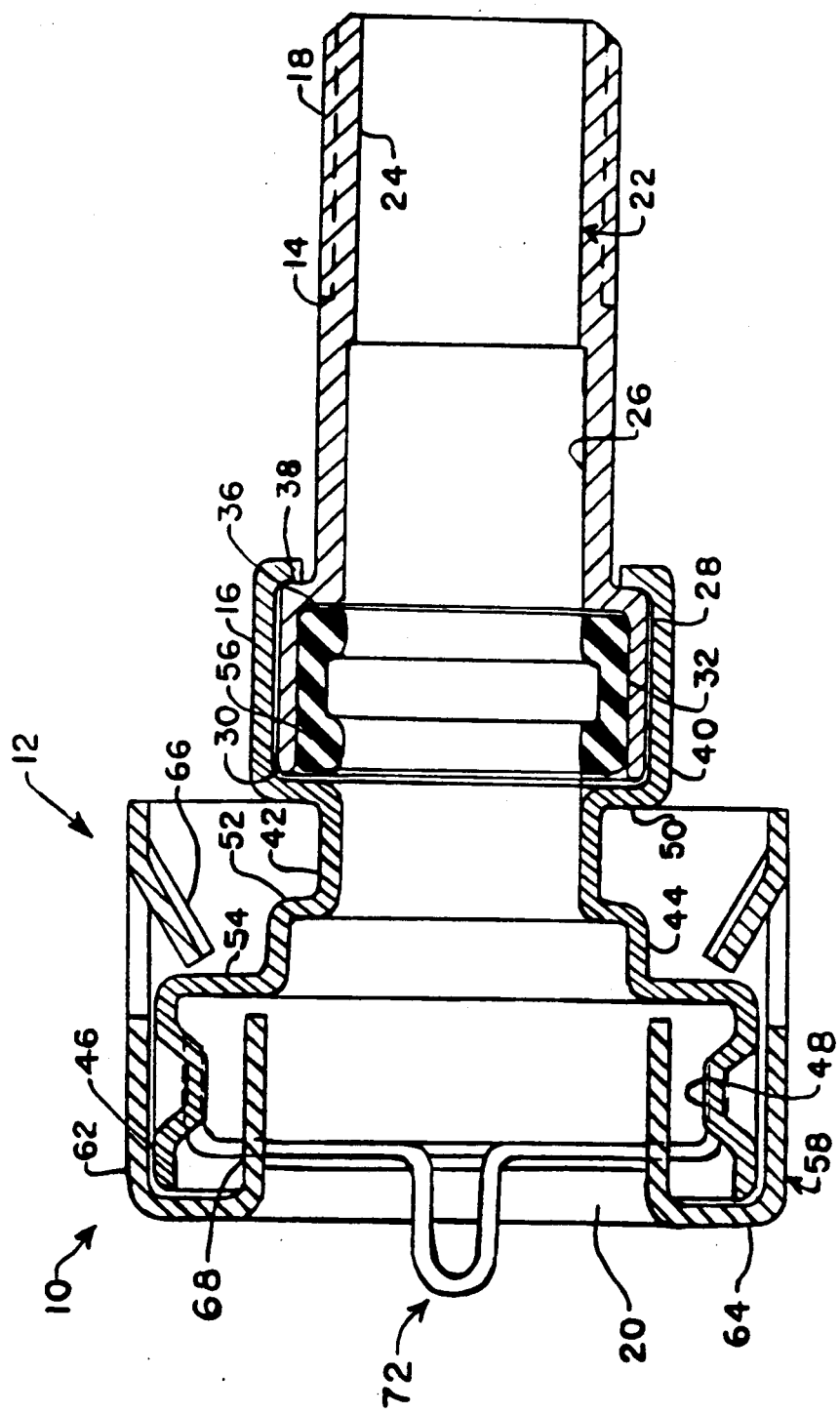
FIG. 5 is a sectional view of the coupling of FIG. 4 taken along its longitudinal axis.

FIGS. 4 and 5 illustrate a second preferred embodiment of the present invention wherein like parts are designated by like numbers. This embodiment is substantially similar to and operates in substantially the same way as the embodiment described above.

In this embodiment, however, locking assembly 58 is further equipped with a pair of retaining clips 72. Furthermore, the planar flanges of spring elements 60' terminate in retaining members configured to secure retaining clips 72 to locking assembly 58.

Retaining clips 72 each comprise a pair of straight parallel legs 74 connected by a perpendicular member 76 having a bridging element 78. Bridging element 78 extends upwardly from connecting member 76 and comprises a pair of members which are parallel to legs 74. The uppermost portion of bridging element 78 is circular and bent at angle with respect to the plane defined by legs 74. Spring elements 60' are substantially similar to the spring elements of the previous embodiment, but are further equipped with cylindrical sleeves 70 integrally formed at the outermost end of each planar flange. Sleeves 70 are configured to receive legs 74 of clips 72.

When in place, the uppermost portion of bridging portion 78 extends through opening 20 and beyond U-shaped lower flange 64 of receptacle 12. The lowermost portion of bridging element 78 and connecting member 76 traverse a portion of the opening in collar 62. Thus, retaining clips 72 provide additional means for retaining plug 80 within the receptacle. In particular, retaining clips 72 are designed and configured so that the parallel members of bridging element 78 firmly engage the tubular body of plug 80 when the plug is inserted into receptacle 12. As the plug is urged inwardly, retaining flange 90 of the plug encounters the uppermost portion of bridging element 78 inhibiting the inward movement thereof. Subsequent inward motion of plug 80 forces the perpendicular members of clips 72 outward so that the plug can be fully installed within receptacle 12. Once flange 90 of plug 80 has been inserted into receptacle 12 beyond perpendicular member 76, this member returns to its initial position in which it firmly secures the tubular body of plug 80. Thereafter, plug 80 is installed within receptacle 12 as described above. Thus, retainer clips 72 provide additional retaining force to plug 80 beyond that already ready for by spring elements 60'.

Figure 6:
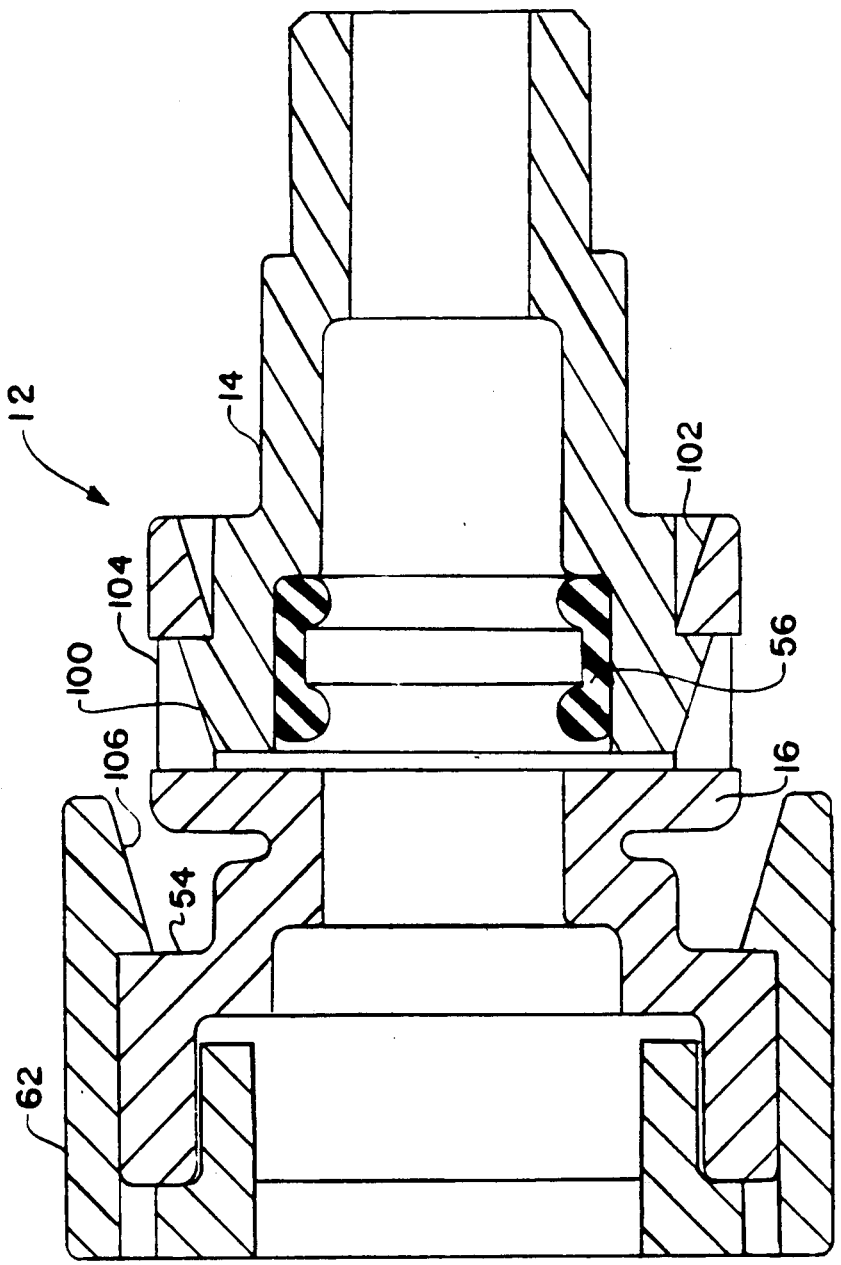
FIG. 6 is a sectional view of another embodiment of a coupling according to the invention.

FIG. 6 illustrates another preferred embodiment of the present invention wherein like parts are designated by like numbers. In this embodiment, male member 14 is equipped with at least two outwardly projecting interlocking finger 100. Female member 16 is equipped with mating fingers 102 and apertures 104 to accommodate the interlocking fingers 100 of male member 14. Thus male member 14 and female member 16 can be snapped together for quick, simple assembly by inserting male member 14 into female member 16. As force is applied to male member 14 relative to female member 16 interlocking fingers 100 are forced inward by the inclined surface of fingers 102 to permit complete insertion of the male member. When interlocking fingers 100 of male member 14 have moved completely past fingers 102 and are aligned with apertures 104 then interlocking fingers 100 return to their initial position thereby engaging the rearward surface of fingers 102. Male member 14 is thereby securely retained in female member 16 and can only be removed by apply sufficient force to interlocking fingers 100 to force them inwards beyond mating fingers 102. Similarly, tubular collar 62 is provided with mating fingers 106 which engage behind annular shoulder 54 to allow tubular collar 62 to be quickly snapped on to female member 16.

While it is apparent that the invention herein disclosed is well calculated to fulfill the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. A readily attachable and detachable coupling comprising:
    a receptacle member having a longitudinal axis, a first end configured to mate with one end of a first conduit, a second end, and an aperture extending from said first end to said second end to form a profiled bore having an enlarged inner diameter at said second end;
    a plug member to be received within said receptacle member comprising a tubular body having a first end configured and adapted to fit into said profiled bore of said receptacle member, a second end configured to mate with one end of a second conduit, inner and outer surfaces, said inner surface defining an axial bore of constant diameter extending longitudinally from said first end to said second end and an annular retaining flange projecting outwardly from said outer surface, said flange spaced from said first end;
    a locking member operatively associated with said second end of said receptacle and having an engaged position and a disengaged position, said locking member comprising means for retaining said locking member on said receptacle, a pair of resilient spring elements and a rotatable tubular collar operatively associated therewith, said collar having an opening to receive said first end of said plug member, each of said spring elements having a portion projecting inward across a segment of said collar opening in said engaged position, and wherein each of said spring elements comprises a truncated semi-conical section terminating at the smaller diameter end of said semi-conical section in a partial cylindrical portion and terminating at each side of said semi-conical section in a planar flange; and
    a sealing member positioned within said profiled bore of said receptacle, wherein said plug member is insertable within said receptacle member bore so that said annular retaining flange outwardly displaces said inwardly projecting portions of said spring elements, and wherein said spring elements return to their initial configuration after ward of said spring elements thereby securing said plug member within said receptacle member, said sealing member sealing the outer surface of said plug member within said receptacle member profiled bore.

2. The coupling of claim 1 wherein said profiled bore of said receptacle member comprises a first cylindrical portion adjacent to said first end, a second cylindrical portion larger in diameter and adjacent to said first cylindrical portion forming a first annular shoulder between said first cylindrical portion and said second cylindrical portion, and a third cylindrical portion between said second cylindrical portion and said second end, said third cylindrical portion being larger in diameter than said second cylindrical portion and forming a second annular shoulder between said second and third cylindrical portions.

3. The coupling of claim 2 wherein the diameter of said outer surface of said plug is larger than the inner diameter of said first cylindrical portion of said receptacle profiled bore and is slightly smaller than the inner diameter of said second cylindrical portion of said receptacle profiled bore such that said plug member is slideable within said second cylindrical portion until said annular flange of said plug member abuts said second annular shoulder.

4. The coupling according to claim 2 wherein said receptacle member is an assembly comprising:
    a male tubular member having a first end with means for engaging one end of said first conduit and a second end having an enlarged cylindrical portion with said sealing member disposed therein; and
    a female tubular member having a first cylindrical portion adjacent to a first end configured and adapted to receive said enlarged cylindrical portion of said male member therewithin and a second larger cylindrical portion adjacent to a second end.

5. The coupling according to claim 4 wherein said sealing member is a single member two lobed seal entrapped between said annular shoulder adjacent said enlarged cylindrical portion of said male member and said annular shoulder adjacent to said first cylindrical portion of said female member.

6. The coupling according to claim 4 wherein said spring elements are disposed within said second larger cylindrical portion of said female tubular member so that said semi-conical sections are diametrically opposed forming an inwardly projecting funnel-shape.

7. The coupling according to claim 6 wherein the outermost end of said planar flanges of said spring elements terminate in cylindrical sleeves and wherein said locking member further comprises a pair retainer clips positioned within said cylindrical sleeves.

8. The coupling of claim 7 wherein the legs of said retainer clips are parallel and are connected by a perpendicular member having a bridging element, said bridging element extending upward from said perpendicular member in a direction parallel to said legs, and wherein the uppermost portion of said bridging element is circular and bent at an angle with respect to the plane formed by said parallel legs.

9. The coupling of claim 8 wherein said perpendicular members of said retainer clips traverse a portion of said collar opening such that the perpendicular members and the lowermost portion of said bridging elements engage said plug thereby providing additional retaining force thereto.

10. The coupling according to claim 1 wherein said tubular collar comprises means for displacing said spring elements from said engaged position, whereby rotation of said tubular collar places said locking element in the disengaged position, and wherein subsequent release of said collar returns said locking member to the engaged position.

11. A readily attachable and detachable coupling comprising:
a receptacle assembly comprising a male member and a mating female member, said assembly having a first end configured to mate with one end of a first conduit, a second end, and an aperture extending from said first end to said second end to form a profiled bore having an enlarged inner diameter at said second end;
a plug member to be received within said receptacle assembly comprising a tubular body having a first end configured and adapted to fit into said profiled bore of said receptacle member, a second end configured to mate with one end of a second conduit, inner and outer surfaces, said inner surface defining an axial bore of constant diameter extending longitudinally from said first end to said second end and an annular retaining flange projecting outwardly from said outer surface, said flange spaced from said first end;
a locking assembly operatively associated with said second end of said receptacle and assembly having an engaged position and a disengaged position, said locking assembly comprising means for retaining said locking member on said receptacle, a pair of resilient spring elements and a rotatable tubular collar operatively associated therewith, said collar having an opening to receive said first end of said plug member, each of said spring elements having a portion projecting inward across a segment of said collar opening in said engaged position; and
a sealing member disposed in said male member and positioned within said profiled bore of said receptacle, wherein said plug member is insertable within said receptacle assembly bore so that said annular retaining flange outwardly displaces said inwardly projecting portions of said spring elements, and wherein said spring elements return to their initial configuration after said annular flange is positioned within said receptacle forward of said spring elements, thereby securing said plug member within said receptacle assembly, said sealing member sealing the outer surface of said plug member within said receptacle member profiled bore.

12. The coupling of claim 11 wherein said profiled bore of said receptacle assembly comprises a first cylindrical portion adjacent to said first end, a second cylindrical portion larger in diameter and adjacent to said first cylindrical portion forming a first annular shoulder therebetween and a third cylindrical portion between said second cylindrical portion and said second end, said third cylindrical portion being larger in diameter than said second cylindrical portion and forming a second annular shoulder between said second and third cylindrical portions.

13. The coupling of claim 12 wherein the diameter of said outer surface of said plug is larger than the inner diameter of said first cylindrical portion of said receptacle profiled bore and is slightly smaller than the inner diameter of said second cylindrical portion of said receptacle profiled bore such that said plug member is slideable within said second cylindrical portion until said annular retaining flange of said plug member abuts said second annular shoulder.

14. The coupling of claim 12 wherein said male member of said receptacle assembly comprises a tubular body having a first end with means for engaging one end of said first conduit and a second end having an enlarged cylindrical portion.

15. The coupling of claim 14 wherein said female member of said receptacle assembly comprises a tubular body having a first cylindrical portion adjacent to a first end configured and adapted to receive said enlarged cylindrical portion of said male member therewithin and a second larger cylindrical portion adjacent to a second end.

16. The coupling according to claim 15 wherein said sealing member is a single member two lobed seal entrapped between an annular shoulder adjacent said enlarged cylindrical portion of said male member and an annular shoulder adjacent to said first cylindrical portion of said female member.

17. The coupling according to claim 16 wherein each of said spring elements comprise a truncated semi-conical section terminating at the smaller diameter end of said semiconical section in a partial cylindrical portion and terminating at each side of said semi-conical section in a planar flange.

18. The coupling according to claim 17 wherein said spring elements are disposed within said second larger cylindrical portion of said female tubular member so that said semi-conical sections are diametrically opposed forming an inwardly projecting funnel-shape.

19. The coupling according to claim 18 wherein the outermost end of said planar flanges of said spring elements terminate in cylindrical sleeves and wherein said locking assembly further comprises a pair retainer clips positioned within said cylindrical sleeves.

20. The coupling of claim 19 wherein the legs of said retainer clips are parallel and are connected by a perpendicular member having a bridging element, said bridging element extending upward from said perpendicular member in a direction parallel to said legs, and wherein the uppermost portion of said bridging element is circular and bent at an angle with respect to the plane formed by said parallel legs.

21. The coupling of claim 20 wherein said perpendicular members of said retainer clips traverse a portion of said collar opening such that the perpendicular members and the lowermost portion of said bridging elements engage said plug thereby providing additional retaining force.

22. The coupling according to claim 11 wherein said tubular collar comprises means for displacing said spring elements from said engaged position, whereby rotation of said tubular collar places said locking assembly in the disengaged position, and wherein subsequent release of said collar returns said locking member to the engaged position.

23. A readily attachable and detachable coupling comprising:

a receptacle assembly comprising a male member and a mating female member, said assembly having a longitudinal axis, a first end configured to mate with one end of a first conduit, a second end, and an aperture extending from said first end to said second end to form a profiled bore coincident with said longitudinal axis and having an enlarged inner diameter at said second end;

a plug member to be received within said receptacle assembly comprising a tubular body having a first end configured and adapted to fit into said profiled bore of said receptacle assembly, a second end configured to make with one end of a second conduit, inner and outer surfaces, said inner surface defining an axial bore of constant diameter extending longitudinally from said first end to said second end and an annular retaining flange projecting outwardly from said outer surface, said flange spaced from said first end;

a locking assembly operatively associated with said second end of said receptacle assembly and having an engaged position and a disengaged position, said locking assembly comprising means for retaining said locking assembly on said receptacle; a pair of resilient spring elements having a truncated semi-conical section terminating at the smaller diameter end of said semi-conical section in a partial cylindrical portion and terminating at each side of said semi-conical section in a planar flange; and a rotatable tubular collar operatively associated therewith wherein rotation of said collar places said locking assembly in the disengaged position, and wherein subsequent release of said collar returns said locking assembly to the engaged position, said collar having means for displacing said spring elements from said engaged position, and an opening to receive said first end of said plug member, each of said spring elements having a portion projecting inward across a segment of said collar opening in said engaged position; and a sealing member positioned within said profiled bore of said receptacle, wherein said plug member is insertable within said receptacle assembly bore so that said annular retaining flange outwardly displaces said inwardly projecting portions of said spring elements, and wherein said spring elements return to their initial configuration after said annular flange is positioned within said receptacle forward of said spring elements, thereby securing said plug member within said receptacle assembly, said sealing member sealing the outer surface of said plug member within said receptacle member profiled bore.

24. The coupling of claim 23 wherein said profiled bore of said receptacle assembly comprises a first cylindrical portion adjacent to said first end, a second cylindrical portion larger in diameter and adjacent to said first cylindrical portion forming a first annular shoulder therebetween and a third cylindrical portion between said second cylindrical portion and said second end, said third cylindrical portion being larger in diameter than said second cylindrical portion and forming a second annular shoulder between said second and third cylindrical portions.

25. The coupling of claim 24 wherein the diameter of said outer surface of said plug is larger than the inner diameter of said first cylindrical portion of said receptacle profiled bore and is slightly smaller than the inner diameter of said second cylindrical portion of said receptacle profiled bore such that said plug member is slideable within said second cylindrical portion until said annular retaining flange of said plug member abuts said second annular shoulder.

26. The coupling of claim 24 wherein said male member of said receptacle assembly comprises a tubular body having a first end with means for engaging one end of said first conduit and an enlarged cylindrical portion adjacent to a second end.

27. The coupling of claim 26 wherein said female member of said receptacle assembly comprises a tubular body having a first cylindrical portion adjacent to a first end adapted to receive said enlarged cylindrical portion of said male member therewithin and a second larger cylindrical portion adjacent to a second end.

28. The coupling according to claim 27 wherein said sealing member is a single member two lobed seal entrapped between an annular shoulder adjacent said enlarged cylindrical portion of said male member and an annular shoulder adjacent to said first cylindrical portion of said female member.

29. The coupling according to claim 28 wherein said spring elements are disposed within said second larger cylindrical portion of said female tubular member so that said semi-conical sections are diametrically opposed forming an inwardly projecting funnel-shape.

30. The coupling according to claim 29 wherein the outermost end of said planar flanges of said spring elements terminate in cylindrical sleeves and wherein said locking assembly further comprises a pair retainer clips positioned within said cylindrical sleeves.

31. The coupling of claim 30 wherein the legs of said retainer clips are parallel and are connected by a perpendicular member having a bridging element, said bridging element extending upward from said perpendicular member in a direction parallel to said legs, and wherein the uppermost portion of said bridging element is circular and bent at an angle with respect to the plane formed by said parallel legs.

32. The coupling of claim 31 wherein said perpendicular members of said retainer clips traverse a portion of said collar opening such that the perpendicular members and the lowermost portion of said bridging elements engage said plug thereby providing additional retaining force.

* * * * *